United States Patent Office 2,786,855
Patented Mar. 26, 1957

2,786,855

OXIDATION OF Δ⁴-3,6-DIHYDROXY STEROIDS TO Δ⁴-3-KETO-6-HYDROXY STEROIDS

Franz Sondheimer and George Rosenkranz, Mexico City, Mexico, assignors to Syntex S. A., Mexico City, Mexico, a corporation of Mexico No Drawing. Application January 27, 1954,
Serial No. 406,571

Claims priority, application Mexico January 31, 1953

6 Claims. (Cl. 260—397.4)

The present invention relates to cyclopentanophenanthrene compounds and to a method for the preparation thereof. More particularly, the present invention relates to the oxidation of steroid compounds with manganese dioxide.

In our United States patent application Serial No. 364,184, filed June 25, 1953, there is disclosed the oxidation of steroidal $\Delta^4$-3,6-dihydroxy compounds with manganese dioxide at room temperature to the corresponding $\Delta^4$-3-keto-6-hydroxy compounds and at elevated temperatures to the corresponding $\Delta^4$-3,6-diketones respectively. In the aforementioned application there is also disclosed the oxidation of steroidal $\Delta^5$-3, hydroxy compounds with manganese dioxide to form the corresponding $\Delta^{4,6}$-3-ketones.

In United States application Serial No. 344,246, filed March 23, 1953, there is disclosed the oxidation of steroidal allyl alcohols with manganese dioxide.

In accordance with the present invention, we have discovered that manganese dioxide may be utilized for the oxidation of $\Delta^4$-3,6-dihydroxy compounds of the pregnene and androstene series with the production in some instances of novel $\Delta^4$-6-hydroxy-3-ketones of the androstene and pregnene series. Certain of the 6-hydroxy compounds have already been disclosed as of substantial pharmacological interest and others of the 6-hydroxy compounds produced in accordance with the present invention may be readily converted as for example to known 6-keto compounds. Since 6β-hydroxy compounds are produced by biochemical means (United States Patent No. 2,602,769) the production of 6β-hydroxy compounds by chemical methods becomes important for comparison therewith and for the production of the same 6-keto compounds for comparative purposes.

It has further been discovered in accordance with the present invention that $\Delta^5$-pregnene-3β,17α-diol-20-one (17α-hydroxy pregnenolone) may be treated with manganese dioxide to give the novel $\Delta^{4,6}$-pregnadien-17α-ol-3,20-dione (the 6-dehydro derivative of the cortical hormone 17-hydroxyprogesterone, easily converted into the cortical hormone by conventional reduction). Similarly, treatment of $\Delta^5$-pregnene-3β,17α,21-triol-20-one 21-acetate (21-acetoxy, 17α-hydroxy pregnenolone) with manganese dioxide produces $\Delta^{4,6}$-pregnadien-17α,21-diol-3,20-dione 21-acetate (21-acetate of the 6-dehydro derivative of the cortical hormone Reichstein's substance S).

It has been also discovered in accordance with the present invention that oxidation of an allyl alcohol with manganese dioxide (as disclosed in the aforementioned United States application Serial No. 344,246) may be utilized to prepare steroidal $\Delta^9$-12-keto compounds from the corresponding $\Delta^9$-12-hydroxy compounds and steroidal $\Delta^{17}$-21 aldehydes from the corresponding $\Delta^{17}$-21-alcohols.

In practicing the invention the steroid to be treated is preferably dissolved in an organic solvent such as chloroform and shaken at room temperature with manganese dioxide for a prolonged period for selective oxidation of the hydroxy group. For the reactions with manganese dioxide in the hot the steroid is similarly dissolved and refluxed with manganese dioxide for several hours.

The following specific examples serve to illustrate but are not intended to limit the present invention:

Example I

A solution of 2 g. of the diacetate of $\Delta^4$-pregnene-3β,6β-diol-20-one prepared in accordance with Journal of Organic Chemistry 16, 192 (1951) in 100 cc. of methanol was treated with 1.5 g. of sodium hydroxide previously dissolved in 10 cc. of water and the mixture was refluxed for one hour, poured into water and extracted with ether. The ether solution was washed to neutral and dried over sodium sulphate. Direct crystallization from ether afforded 55% yield of $\Delta^4$-pregnen-3β,6β-diol-20-one having a melting point of 188–192° C., [α]_D+95° (chloroform).

500 mg. of $\Delta^4$-pregnene-3β,6β-diol-20-one dissolved in 100 cc. of chloroform was shaken for 24 hrs. at room temperature with 10 g. of manganese dioxide. The solution was filtered and evaporated to dryness. Crystallization of the residue from acetone-ether yielded 260 mg. of $\Delta^4$-pregnen-6β-ol-3,20-dione having a melting point of 173–174° C. (the analytical sample had 181–183° C.), [α]_D+105° (chloroform). The compound has an ultraviolet absorption maximum at λ max. 238 mμ (log ε 4.26). The infrared spectrum confirms the presence of a free hydroxy group as well as the $\Delta^4$-3-keto and 20-keto groups.

A solution of 500 mg. of 6β-hydroxyprogesterone in 2 cc. of pyridine and 2.5 cc. of acetic anhydride was heated on the steam bath for 1 hr. and then poured into water. The product was worked up under the usual conditions and crystallization from ether-hexane gave 100% yield of the acetate of $\Delta^4$-pregnen-6β-ol-3,20-dione having a melting point of 141–143° C., [α]_D+95° (ethanol). The compound has an ultraviolet absorption maximum at λ max. 236 mμ (log ε 4.28). The infrared spectrum confirms the presence of an acetyl group as well as the 20-keto and $\Delta^4$-3-keto groups.

The following equation illustrates the process of the present example:

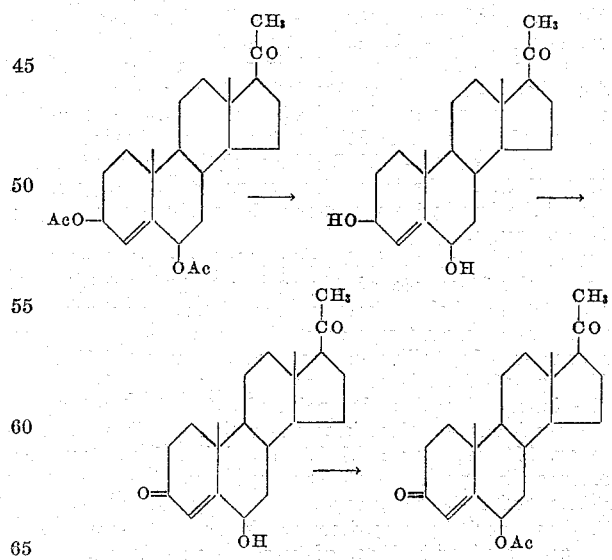

Example II 700 mg. of $\Delta^4$-pregnene-3β,6β-diol-20-one was dissolved in 80 cc. of chloroform and mixed with 8 g. of manganese dioxide. The mixture was refluxed under stirring for 6 hrs., filtered and evaporated to dryness. The residue was chromatographed in a column with 30 g. of washed aluminum oxide. The crystalline fractions eluted from the column and which had similar melting points were combined, thus giving 320 mg. of Δ⁴-pregnene-3,6,20-trione (6-ketoprogesterone, a known steroid hormone) which after recrystallization from chloroform-ether had a melting point of 188–190° C., $[\alpha]_D+24°$ (chloroform); λ max. 250 mμ (log ε 4.19). In contrast with the product obtained in Example No. I, this product does not exhibit the typical infrared band of free hydroxy groups, but it does show the typical bands of saturated and unsaturated keto groups.

The following equation illustrates the process of the present example:

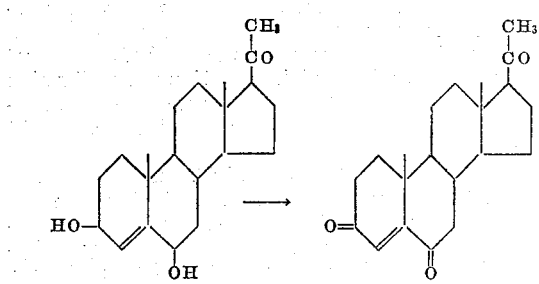

Example III

A solution of 13 g. of the triacetate of Δ⁴-pregnene-3β,6β,21-triol-20-one prepared in accordance with Journal of Organic Chemistry 16, 192 (1951) in 300 cc. of methanol was mixed under an atmosphere of nitrogen with a solution of 13 g. of sodium hydroxide in 60 cc. of water after both solutions had been cooled, and the mixture was kept under nitrogen for 24 hrs. at room temperature. It was then neutralized with acetic acid, concentrated to a small volume under reduced pressure, poured into water and the precipitate was extracted with chloroform. Crystallization from chloroform-ether gave 8 g. of Δ⁴-pregnene-3β,6β,21-triol-20-one having a melting point of 200–203° C. (the analytical sample had a melting point of 203–206° C.).

A solution of 970 mg. of Δ⁴-pregnene-3β,6β,21-triol-20-one in 2.5 cc. of anhydrous pyridine was cooled to −10° C. and mixed with 1.2 molar equivalents of acetic anhydride previously cooled to −10° C. The flask was quickly stoppered and then kept for 24 hrs. at a temperature of −10° C., poured into water and extracted with ether. Chromatography followed by one crystallization from acetone afforded 490 mg. of the 21-monoacetate of Δ⁴-pregnene-3β,6β,21-triol-20-one having a melting point of 190–192° C. (the analytical sample had 193–195° C.). The infrared spectrum shows the presence of the free hydroxy groups and the 21-acetoxy and 20-keto groups.

10 g. of manganese dioxide was added to a solution of 1 g. of the 21-acetate of Δ⁴-pregnene-3β,6β,21-triol-20-one in 100 cc. of chloroform and the mixture was shaken for 24 hrs. at room temperature, filtered and evaporated to dryness. Crystallization from acetone-ether yielded 600 mg. of the 21-acetate of Δ⁴-pregnene-6β,21-diol-3,20-dione having a melting point of 198–200° C. The compound has an ultraviolet absorption maximum at λ max. 238 mμ (log ε 4.26). The infrared spectrum confirms the presence of free hydroxy, 21-acetoxy, 20-keto and Δ⁴-3-keto groups.

300 mg. of 6β-hydroxy-desoxycorticosterone 21-acetate was acetylated with 1 cc. of pyridine and 1.5 cc. of acetic anhydride by the method described in Example No. I. Crystallization from ether-pentane gave 300 mg. of the diacetate of Δ⁴-pregnene-6β,21-diol-3,20-dione having a melting point of 128–130° C., $[\alpha]_D+101°$ (chloroform). The ultraviolet spectrum has an absorption band at 236 mμ (log ε 4.18).

The following equation illustrates the process of the present example:

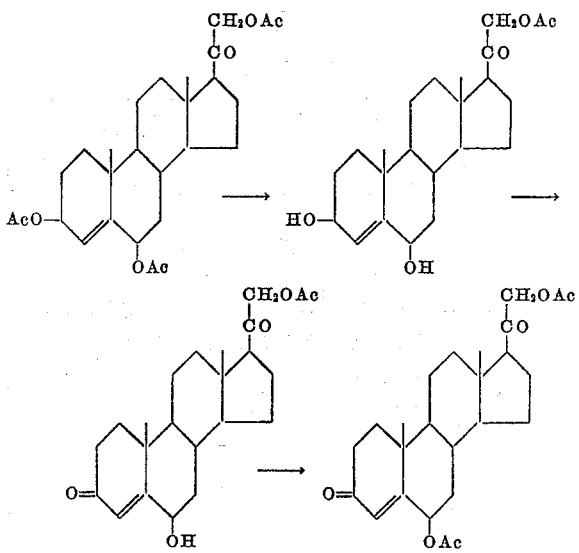

*Example IV*

In the same way as described in Example II, 1 g. of the 21-acetate of Δ⁴-pregnene-3β,6β,21-triol-20-one in 100 cc. of chloroform was treated with 10 g. of manganese dioxide. Chromatography of the product and recrystallization from acetone-ether yielded 260 mg. of the acetate of Δ⁴-pregnen-21-ol-3,6,20-trione (acetate of 6-keto-desoxycorticosterone) having a melting point of 137–139° C., ultraviolet absorption maximum at λ max. 248 mμ (log ε 4.05). The infrared spectrum confirms the presence of an acetyl and 20-keto group, as well as the presence of a Δ⁴-3,6-diketone.

The following equation illustrates the process of the present example:

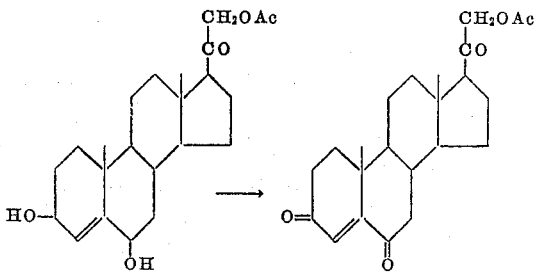

*Example V*

3 g. of manganese dioxide was added to a suspension of 1 g. of Δ⁴-androstene-3β,6β-diol-17-one (prepared by saponification of diacetate; Petrow et al. Journal Chem. Soc. 2536 (1949)) in 100 cc. of chloroform and the mixture was shaken for 24 hrs. at room temperature. The solution was filtered and evaporated to dryness. Crystallization from chloroform-ether afforded 600 mg. of Δ⁴-androsten-6β-ol-3,17-dione having a melting point of 187–189° C. (the analytical sample had a melting point of 192–194° C.), $[\alpha]_D+115°$ (chloroform). The compound shows an ultraviolet absorption maximum at λ max. 236 mμ (log ε 4.27). The infrared spectrum indicates the presence of a free hydroxy group and 17-keto and Δ⁴-3-keto groups.

300 mg. of 6β-hydroxy-androstene-3,17-dione was acetylated with 1 cc. of pyridine and 1.5 cc. of acetic anhydride such as described in Example I. The product was crystallized from chloroform to give 150 mg. of the acetate of Δ⁴-androsten-6β-ol-3,17-dione having a melting point of 190–194° C. (analytical sample, melting point 198–201° C.), $[\alpha]_D+106°$ (acetone). It shows an ultraviolet absorption maximum at λ max. 234 mμ (log ε

4.21). The infrared spectrum confirms the presence of 17-keto and $\Delta^4$-3,keto groups.

The following equation illustrates the process of the present example:

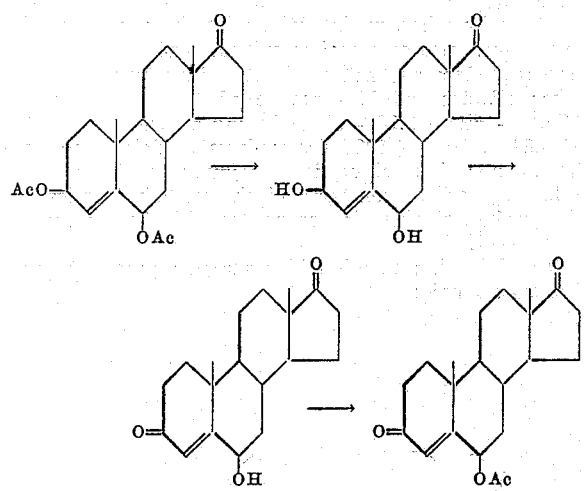

*Example VI*

10 g. of manganese dioxide was added to a suspension of 1 g. of $\Delta^4$-androstene-3β,6β-diol-17-one in 100 cc. of chloroform and the mixture was refluxed for 8 hrs. under stirring. The solution was filtered and evaporated to dryness and the residue was chromatographed in a column with 50 g. of previously washed aluminum oxide. The fractions having similar melting points were combined, thus giving 310 mg. of $\Delta^4$-androstene-3,6,17-trione having a melting point of 220–221° C., $[\alpha]_D +43°$ (acetone). The compound shows an ultraviolet absorption maximum at λ max. 248 mμ (log ε 4.20). The infrared spectrum confirms the presence of the 17-keto group and has an additional band at 1680 cm.$^{-1}$, characteristic of unsaturated carbonyl groups.

The following equation illustrates the process of the present example:

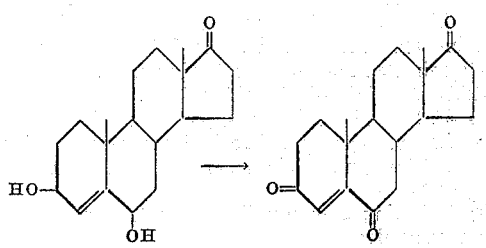

*Example VII*

A suspension of 2 g. of lithium aluminum hydride in anhydrous ether was slowly added to a solution of 4 g. of the diacetate of $\Delta^4$-androstene-3β,6β-diol-17-one in tetrahydrofurane. After decomposing the excess of reagent by the addition of acetone, water was added and the precipitate was filtered and washed. Crystallization from chloroform produced 2.36 g. of $\Delta^4$-androstene-3β,6β,17β-triol having a melting point of 208–212° C., $[\alpha]_D +13°$ (dioxane). This compound has no selective absorption in the ultraviolet spectrum and the infrared spectrum indicates the presence of free hydroxy groups.

1 g. of $\Delta^4$-androstene-3β,6β,17β-triol was dissolved in 100 cc. of chloroform and oxidized with manganese dioxide such as described in the previous examples, at room temperature. Crystallization from chloroform-ether gave 480 mg. of $\Delta^4$-androstene-6β,17β-diol-3-one having a melting point of 215–216° C., $[\alpha]_D +35°$ (chloroform), λ max. 238 mμ (log ε 4.25). The infrared spectrum shows the presence of free hydroxyl and $\Delta^4$-3-keto groups.

250 mg. of this 6β-hydroxytestosterone was acetylated by the method described in previous examples. Chromatography and crystallization from ether-pentane yielded 120 mg. of the diacetate of $\Delta^4$-androstene-6β,17β-diol-3-one having a melting point of 132–133° C., $[\alpha]_D +26°$ (chloroform), λ max. 234 mμ (log ε 4.18). The infrared spectrum shows the presence of the acetate group as well as the $\Delta^4$-3-keto group. Similar esterification produced other conventional esters especially lower fatty esters, such as the propionate, or aromatic esters such as the benzoate.

The following equation illustrates the process of the present example:

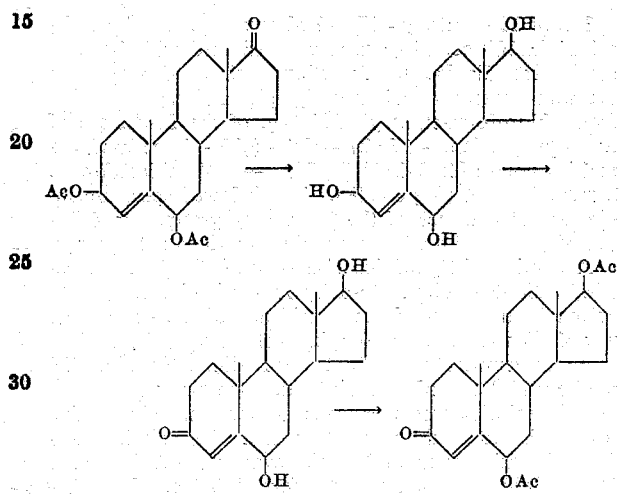

*Example VIII*

13 g. of manganese dioxide was added to a suspension of 1.37 g. of $\Delta^4$-androstene-3β,6β,17β-triol in 130 cc. of chloroform and the mixture was refluxed as described in the previous examples. Chromatography and crystallization from acetone-ether produced 500 mg. of $\Delta^4$-androsten-17β-ol-3,6 dione having a melting point of 213–215° C., $[\alpha]_D -52°$ (acetone), λ max. 250 mμ (log ε 4.17). The infrared spectrum reveals the presence of a free hydroxy group and shows a band at 1680 cm.$^{-1}$, characteristic of unsaturated carbonyl groups.

The following equation illustrates the process of the present example:

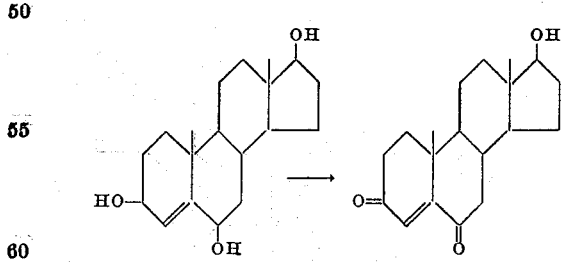

*Example IX*

1 g. of 17α-hydroxypregnenolone suspended in 100 cc. of benzene was oxidized with 10 g. of manganese dioxide at the refluxing temperature such as described in the previous examples. Crystallization from acetone-ether afforded 190 mg. of $\Delta^{4,6}$-pregnadien-17α-ol-3,20-dione having a melting point of 240–242° C., $[\alpha]_D +21°$ (chloroform), λ max. 284 mμ (log ε 4.53). The infrared spectrum shows the presence of a free hydroxy group as well as a 20-keto and an unsaturated keto group. Selective saturation of the 6-7 double bond as described in Example X gave the known hormone 17α-hydroxyprogesterone.

The following equation illustrates the process of the present example:

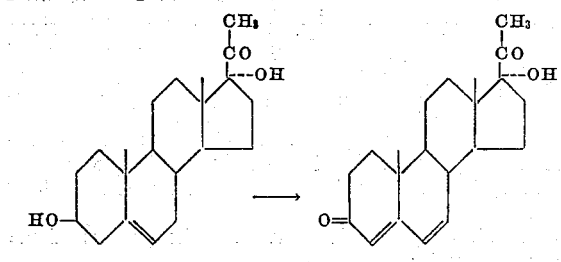

Example X 3 g. of 21 - acetoxy - 17α - hydroxy - pregnenolone dissolved in 300 cc. of benzene was oxidized with 30 g. of manganese dioxide under reflux such as described in previous examples. Chromatography and crystallization from chloroform-ether yielded 1 g. of the 21-acetate of $\Delta^{4,6}$ - pregnadiene - 17α,21 - diol - 3,20 - dione having a melting point of 218–221° C., $[\alpha]_D$ +104° (chloroform), λ max. 284 mμ (log ε 4.48). The infrared spectrum indicates the presence of the 21-acetoxy group, a free hydroxy group and the 20-keto and unsaturated keto groups.

A solution of 1 g. of this 21-acetate of $\Delta^{4,6}$-pregnadiene-17α,21-diol-3,20-dione (6-dehydro derivative of Compound S) in 50 cc. of acetic acid and 50 cc. of benzene was shaken under an atmosphere of nitrogen for 20 hrs. at room temperature with 2 g. of granulated zinc (30 mesh) and 0.2 g. of ascorbic acid. The zinc was filtered and the solution was evaporated to dryness. The residue was collected with chloroform and the solution was washed with water and again evaporated to dryness. Crystallization from acetone afforded 0.8 g. of the 21-acetate of $\Delta^4$-pregnene-17α,21-diol-3,20-dione (acetate of Reichstein's Compound S) having a melting point of 239—241° C., $[\alpha]_D$+116° (acetone).

The following equation illustrates the process of the present example:

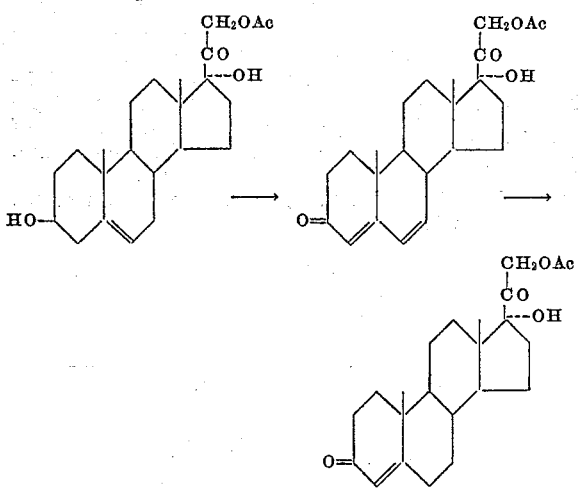

Example XI 3.2 g. of the 21-acetate of $\Delta^4$-pregnane-17α,21-diol-3,20-dione was dissolved in 300 cc. of chlorobenzene and 20 cc. of the solvent was distilled in order to remove traces of moisture. Then 8 cc. of carbon tetrachloride with 0.8 cc. of anhydrous pyridine and 1.6 g. of well powdered N-bromosuccinimide was added and the mixture was refluxed for 12 minutes with a photoflood lamp as source of light and heat. The mixture was cooled, washed with water, dried over sodium sulphate and evaporated to dryness at not too high a temperature under reduced pressure. The residue crystallized upon addition of ether. Recrystallization from acetone-ether gave the 21-acetate of 6 - bromo - $\Delta^4$ - pregnene - 17α,21 - diol - 3,20 - one having a melting point which varied between 168 and 177° C., $[\alpha]_D$ +56° (chloroform).

1.2 g. of this 6-bromo derivative was refluxed for 30 minutes with 15 cc. of distilled collidine, the precipitate of collidine hydrobromide was filtered and the solution was diluted with ether, washed with dilute hydrochloric acid and water, dried over sodium sulphate and evaporated to dryness. Recrystallization of the residue from acetone-ether afforded the 21 - acetate of $\Delta^{4,6}$ - pregnadiene-17α,21 - diol - 3,20 - dione having a melting point of 221–223°, $[\alpha]_D$ +102° (chloroform). This compound has an ultraviolet absorption maximum at 284 mμ (log ε 4.50). By direct comparison it showed to be identical to the product obtained in accordance with the method of Example X.

The following equation illustrates the process of the present example:

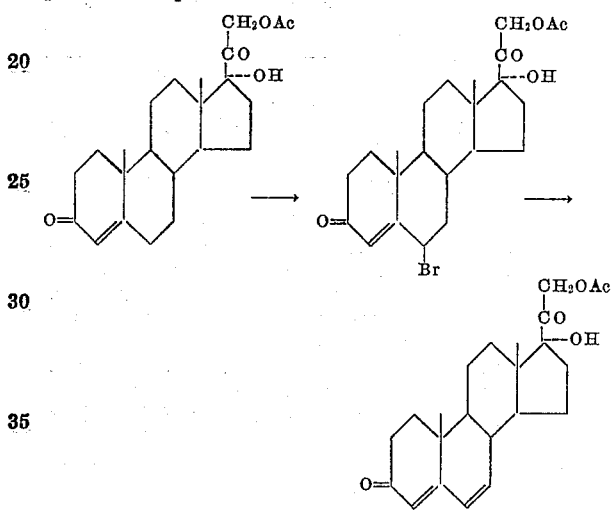

Example XII 500 mg. of $\Delta^{9(11)}$-22a-allospirostene-3β,12β-diol dissolved in 50 cc. of chloroform was oxidized with 5 g. of manganese dioxide shaking for 4 hrs. at room temperature such as described in previous examples. Crystallization from chloroform-acetone yielded 370 mg. of $\Delta^{9(11)}$-22a-allospirosten-3β-ol-12-one having a melting point of 220–223° C., $[\alpha]_D$ —27° (chloroform, λ max. 240 mμ (log ε 4.20). The infrared spectrum of this compound shows the presence of a free hydroxy group and has a band at 1670 cm.$^{-1}$ characteristic of an unsaturated keto group.

The following equation illustrates the process of the present example:

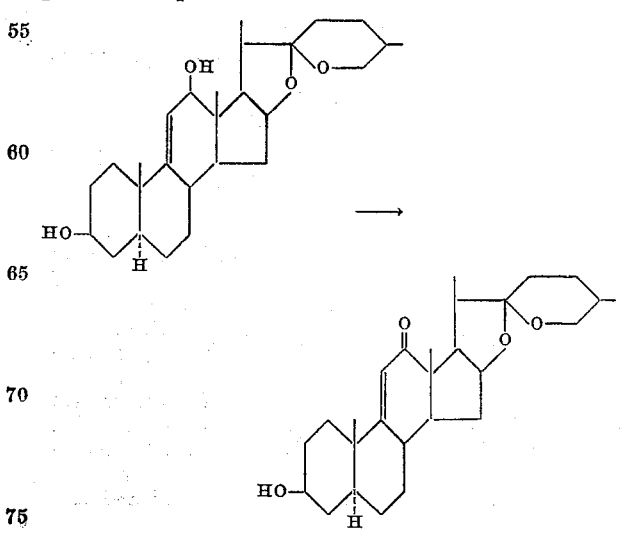

Example XIII 500 mg. of $\Delta^{5,17(20)}$-pregnadiene-3$\beta$,21-diol dissolved in 50 cc. of chloroform was oxidized with 5 g. of manganese dioxide shaking for 5 hrs. at room temperature such as described in previous examples. Crystallization from acetone afforded 325 mg. of $\Delta^{5,17(20)}$-pregnadien-3$\beta$-ol-21-al having a melting point of 178–180° C., $\lambda$ max. 244 m$\mu$ (log $\epsilon$ 4.29).

The following equation illustrates the process of the present example:

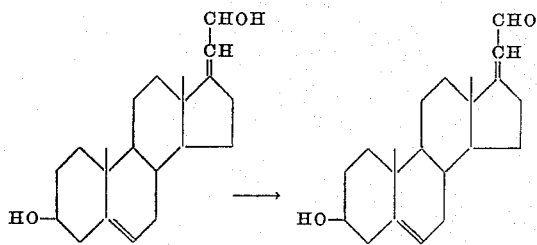

We claim:

1. A process for the production of a $\Delta^4$-3-keto-6-hydroxy compound selected from the group consisting of compounds of the pregnen series and compounds of the androstene series which comprises treating a corresponding $\Delta^4$-3,6-dihydroxy compound with manganese dioxide at room temperature.
2. The process of claim 1 wherein the $\Delta^4$-3-keto-6-hydroxy compound is $\Delta^4$-pregnene-6$\beta$-ol-3,20-dione.
3. The process of claim 1 wherein the $\Delta^4$-3-keto-6-hydroxy compound is $\Delta^4$-pregnene-6$\beta$,21-diol-3,20-dione.
4. The process of claim 1 wherein the $\Delta^4$-3-keto-6-hydroxy compound is the 21-acetate of $\Delta^4$-pregnene-6$\beta$,21-diol-3,20-dione.
5. The process of claim 1 wherein the $\Delta^4$-3-keto-6-hydroxy compound is $\Delta^4$-androstene-6$\beta$-ol-3,17-dione.
6. The process of claim 1 wherein the $\Delta^4$-3-keto-6-hydroxy compound is $\Delta^4$-androstene-6$\beta$,17$\beta$-diol-3-one.

References Cited in the file of this patent

UNITED STATES PATENTS

| | | |
|---|---|---|
| 2,602,769 | Murray | July 8, 1952 |
| 2,683,725 | Murray | July 13, 1954 |